(12) United States Patent
Quinta Cortinas

(10) Patent No.: US 10,549,822 B2
(45) Date of Patent: Feb. 4, 2020

(54) FLOATING STRUCTURE AND METHOD FOR OBTAINING SAME

(71) Applicant: ESPANOLA DE PLATAFORMAS MARINAS, S.L., Valga (ES)

(72) Inventor: Andres Quinta Cortinas, Pontevedra (ES)

(73) Assignee: ESPANOLA DE PLATAFORMAS MARINAS, S.L., Valga (ES)

( * ) Notice: Subject to any disclaimer, the term of this patent is extended or adjusted under 35 U.S.C. 154(b) by 0 days.

(21) Appl. No.: 15/784,312

(22) Filed: Oct. 16, 2017

(65) Prior Publication Data
US 2018/0201347 A1     Jul. 19, 2018

Related U.S. Application Data

(63) Continuation of application No. 14/402,497, filed on Nov. 20, 2014, now Pat. No. 9,902,474.

(30) Foreign Application Priority Data

May 25, 2012    (ES) .................................. 201230794

(51) Int. Cl.
| | |
|---|---|
| *B63B 38/00* | (2006.01) |
| *A01K 61/00* | (2017.01) |
| *A01K 61/54* | (2017.01) |
| *A01K 61/60* | (2017.01) |
| *B63B 3/04* | (2006.01) |

(52) U.S. Cl.
CPC .............. *B63B 38/00* (2013.01); *A01K 61/00* (2013.01); *A01K 61/54* (2017.01); *A01K 61/60* (2017.01); *B63B 3/04* (2013.01); *Y10T 29/49826* (2015.01)

(58) Field of Classification Search
CPC .... A01K 61/00; A01K 61/002; A01K 61/007; A01K 61/54; A01K 61/60; A01K 75/04; B63B 35/613; B63B 35/38; B63B 38/00; B63B 3/04; Y10T 29/49826
USPC ........... 114/264–266; 405/218–221; 119/223
See application file for complete search history.

(56) References Cited

U.S. PATENT DOCUMENTS

| | | | | |
|---|---|---|---|---|
| 2,492,626 A | * | 12/1949 | Fletcher | ............. B65D 19/0095 |
| | | | | 108/57.14 |
| 3,256,839 A | * | 6/1966 | Peterson | ............ B65D 19/0073 |
| | | | | 108/56.1 |
| 3,369,664 A | * | 2/1968 | Dahan | ..................... E02B 15/06 |
| | | | | 210/242.1 |

(Continued)

*Primary Examiner* — Patrick D Hawn
(74) *Attorney, Agent, or Firm* — Luoh J. Wu; Continent Patent Office LLP

(57) ABSTRACT

A floating structure and method for obtaining same. The structure includes a first plurality of tubes and a second plurality of tubes. The second plurality of tubes are inserted into the first plurality of tubes to extend through the upper portion of same, and both sets of tubes are welded together. The ends of the tubes of the first plurality of tubes are closed in order to be used as flotation tanks when the floating structure is fitted out for such use. The method concerns locking the first plurality of tubes in place on the frame, with pairs of holes in each of the first plurality of tubes being aligned, and a corresponding tube of the second plurality of tubes being inserted through each pair of aligned holes by force. Each of the connection portions or parts contained in the tubes are welded on the periphery of the holes.

1 Claim, 4 Drawing Sheets

(56) References Cited

U.S. PATENT DOCUMENTS

| | | | | |
|---|---|---|---|---|
| 3,654,877 | A * | 4/1972 | Barrett | B65D 19/0095 108/56.1 |
| 3,726,098 | A * | 4/1973 | Alms | E02B 3/064 114/266 |
| 4,712,509 | A * | 12/1987 | Vangen | A01K 61/60 119/223 |
| 4,752,393 | A * | 6/1988 | Meyers | E02B 15/06 210/242.3 |
| 4,831,938 | A * | 5/1989 | Atterby | B31C 1/00 108/51.3 |
| 5,056,452 | A * | 10/1991 | McCain | B63B 35/34 114/263 |
| 5,059,065 | A * | 10/1991 | Doolaege | E02B 3/127 405/107 |
| 5,067,418 | A * | 11/1991 | Carter | B65D 19/0073 108/56.1 |
| 5,140,848 | A * | 8/1992 | Spencer | E02D 31/004 156/64 |
| 5,255,614 | A * | 10/1993 | Voss-Schrader | B65D 19/0097 108/51.3 |
| 5,272,990 | A * | 12/1993 | Carter | B65D 19/0073 108/51.3 |
| 5,816,172 | A * | 10/1998 | Carter | B65D 19/0095 108/51.3 |
| D419,275 | S * | 1/2000 | Carter | D34/38 |
| D419,744 | S * | 1/2000 | Carter | D34/38 |
| 6,044,798 | A * | 4/2000 | Foster | A01K 61/54 119/240 |
| 6,089,176 | A * | 7/2000 | Costello | B63B 35/34 114/263 |
| 6,364,571 | B1 * | 4/2002 | Doolaege | E01D 15/20 405/114 |
| 6,783,300 | B2 * | 8/2004 | Doolaege | E02B 3/108 405/115 |
| 8,920,061 | B2 * | 12/2014 | Quinta Cortinas | B63B 3/08 403/220 |
| 2002/0162515 | A1 * | 11/2002 | Boyd | A01K 61/60 119/223 |
| 2006/0153643 | A1 * | 7/2006 | Basta | B63B 3/06 405/219 |
| 2008/0029040 | A1 * | 2/2008 | Quinta Cortinas | A01K 61/54 119/208 |
| 2013/0340376 | A1 * | 12/2013 | Quinta Cortinas | B63B 3/08 52/655.1 |

* cited by examiner

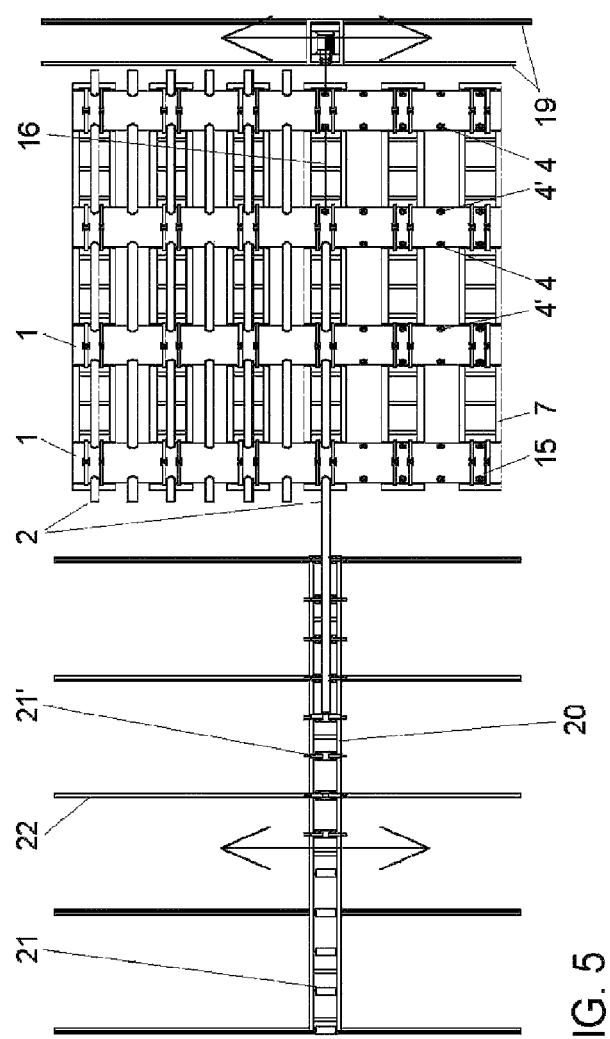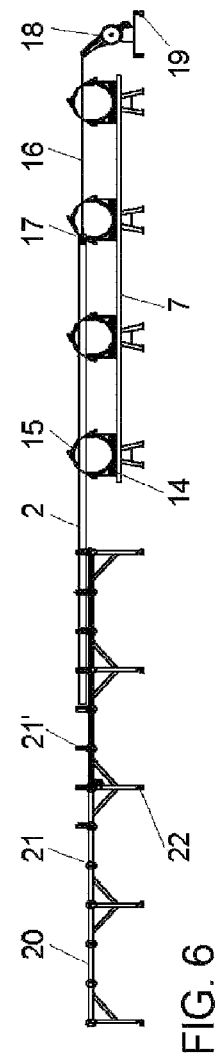

FLOATING STRUCTURE AND METHOD FOR OBTAINING SAME

This application is a continuation application of pending U.S. Patent Publication No. 2015-0144068 A1 published May 28, 2015 and Ser. No. 14/402,497, which claims priority to SPAIN Application No. P201230794 Filed May 25, 2012, all of which are hereby incorporated herein in their entireties by reference.

TECHNICAL ASPECTS

The invention relates to a floating structure and to a method for building it. In particular, this invention refers to a floating structure to be used in aquatic environments as support or transport structure, as well as a sea platform for farming aquatic species and to a method for obtaining same. The structure can be used as a stand-alone element, or as a module, to be part of a floating platform or a platform that can be sunk to buffer sea beating so as to preserve culture and be raised to surface to collect culture.

BACKGROUND OF THE INVENTION

There are floating structures made up of god of large beams and large floaters for goods support and transportation; some of them have added nets or cages where the sea species are kept to breed. There are other grids with ropes that are set perpendicular to it and sink in the water; some sea species, such as bivalve shellfish, mussels or oysters, stick to them to breed. In either model, the culture weight puts the beams under big deflective efforts. causing tensile and compressive strains, which in turn leads to shear strengths on the supports as well as torsion strains, which causes floating and stability problems, and beam cracking and breaking, usually due to deterioration of the building materials and the connections between them.

With the aim of correcting these deficiencies, new high-floatability structures have been designed with high-stability beams for outdoor use, made of metal alloys or synthetic plastic materials. Thus, high-density polyethylene is widely used for the grids used in the construction of bloating structures, well known in the industry as trays or mussels beds, as shown in document ES 2268927, for example. On the other hand, several tests have been performed for improving the design or materials of the connections; however, no result has yet been final. In this regard, stand-alone synthetic plastic connections have been used to link the elements making up the grid, whether they are the double seated parts and tying ropes as shown in the above-mentioned document or the assembly bolts described in documents ES U 1064198 or ES U 1066093, which pass through the beams. These building contributions have proved to be inefficient, as they must be continuously adjusted and the materials used usually tear open.

OBJECT OF THE INVENTION

Consequently, a new floating structure has been designed to be enhanced as for example, a platform for supporting or transporting people or goods, or for breeding several sea species, which is capable of reducing or eliminating all mentioned issues, thus increasing resistance and floatability with or without load, also preventing overturning, thus improving operating efficiency and extending its useful life, as well as providing a simple, economical method for obtaining it.

DESCRIPTION OF THE INVENTION

As expressed in the corresponding paragraph of these specifications, the invention relates to a to structure used in aquaculture, which significantly improves the ones in use now; such enhancements affect the connections between grid elements and, therefore, the floating system when the structure is in use.

The structure is expected to be built with beams made of stable materials for outdoor use, such as high-density polyethylene, even though the use of other plastic polymers, metals or metal alloys cannot be discarded. Thus, beams in the structure are provided according to a first plurality of members and a second plurality of members; each member may be of a synthetic plastic material or any other material with high stability for outdoor use, such as stainless steel, although any of them can be used for building the structure. For temporary connections, welding is preferred to join the beams or the grid elements not only because it is easier and more economical than any other alternative processes, but also because the pieces that are so joined become a single one that is as strong or even stronger than the individual elements if the filling material endurance properties to be contributed are strong, which guarantees multiple solutions.

Having chosen welding as the means to join the beams, beam configurations, arrangements and cross-sections have been considered for proactively solving the problems derived from the stress the structure may be subjected to. Thus, it preferred, though not exclusively, to opt for regular round-section tubes for the beams making up the main floating members or first plurality of tubes and for beams making up transverse members or second plurality of tubes in the structure. However, transverse members could be solid instead of hollow under certain conditions.

To obtain the structure, several arrangements have been considered for the transverse beams or second plurality of tubes in the structure with respect to the tubes of the first plurality, and it has been pointed out that only when the transverse beams are laid across the upper semi-cylindrical portion of the tubes of the first plurality of tubes, the floating line of the structure reaches half its thickness and the torsion movements the tubes tend to make are set off by the downward vertical thrust exerted by the culture load.

Both inserting the tubes of the second plurality into those of the first plurality and welding the connecting part of the former into the latter lock the system, dissipate the vibrations of the waves on the structure and prevent the concentration of rupture stress at the connecting points between tubes.

More specifically, the floating structure comprises at least a first plurality of tubes and a second plurality of tubes that keep the tubes of the first plurality longitudinally equidistant and parallel to each other, and the first plurality of tubes and the second plurality of tubes related to each other thus making up a grid-like structure.

Substantially according to the invention, each tube of the first plurality of tubes has an alignment of pairs of hales in its periphery. The holes of each pair of holes are expected to be centered and facing each other on each end of a line running transversally to the longitudinal axis of the tube and parallel over the horizontal plane that divides it into two semi-cylindrical portions, a pairs of holes on each tube being equidistant from one another and the pairs of hales facing each other on the first plurality of tubes respectively crossed by the corresponding tubes of the second plurality of tubes, the portions of a same tube of the second plurality of tubes comprised between the pairs of hales on the tubes of the first plurality of tubes they cross being joined on their ends to the corresponding peripheries of the crossed pair of hales.

For forced insertion and adjustment, the diameter of the hates made in the periphery of the tubes of the first plurality of tubes is approximately as big, though bigger, than the external diameter, the longest diagonal or the widest tube section of the second plurality of tubes crossing them.

Moreover, the invention provides a method for obtaining a floating structure, which includes a first plurality of tubes, of specific length and diameter, and a second plurality of tubes of specific length but smaller diameter and the tubes of the first plurality of tubes being crossed by the tubes of the second plurality of tubes, which includes providing a fixed support frame to form the structure, according to which, in a first stage, an alignment of pairs of hales facing each other at the periphery each tube of the first plurality of tubes is provided so that the holes of each pair of hales, one after the other, are drilled on a same drilling line transversally to the longitudinal axis of the tube, the drilling lines of each of the successive pairs of hales in the alignment running parallel to each other and all the pairs of holes on each tube being equidistant from each other.

On a second stage, the tubes of the first plurality of tubes are laid on corresponding supports or longitudinal cradles, equidistant on the fixed support frame, so that the respective pairs of hales of any of the tubes are aligned in the center with the corresponding pairs of holes of the remaining tubes laid on said fixed support frame and the tubes of the first plurality of tubes are locked on the fixed support frame to prevent its movement and/or shifting.

On a later stage, the tubes of said second plurality of tubes are provided (one by one and successively) from a supply station through a feeder that moves alongside the fixed support frame, mainly parallel to the longitudinal axis of any of the tubes of the first alignment of tubes already laid on said fixed support frame, and are moved forward until they are aligned with the respective and corresponding alignment of pairs of holes on the tubes of the first plurality of tubes which they are intended to cross.

Each successive alignment of tubes of the second plurality with the corresponding alignment of pairs of holes on the tubes of the first plurality of tubes faces the end of a cable provided with a means capable of adjusting to the inner periphery the tube; the cable is rolled in a winch that moves along guides on the opposite side of the fixed support frame and in such a way that, once the cable is adjusted to the fed tube, it is polled therefrom from the winch to make it pass by force through said first alignment of holes, from the first tube of the first plurality of tubes distal from the winch to the last tube of the first plurality of tubes proximal to the winch to finally loosen up the adjustable means and separate the cable from the tube; this is done until, one by one, all the tubes of the first plurality of tubes are crossed by all the tubes of the second plurality of tubes.

Finally, the tube portions of any of the tubes of the second plurality of tubes are welded to the immediate periphery of the hoes made on each tube of the first plurality of tubes, thus ending the formation of the structure, which can be completed in the same facilities or in other workshops for the required use.

It is evident, according to what has been said, that the structure is to be supplemented for use, for example, as a farming platform by closing part of the tubes, or of them making up the beams of the structure, through hydrodynamic or other closing device at the ends, and/or by partitioning all or part of the tubes, and even providing the structure with a system of valves to select when to pour water into and out at the resulting compartments, so that the structure can be used underwater. It is also evident that the structure is to be supplemented for further use with bare or other supports for the breeding robes, or with braces or supports for the cages and the breeding nets it shall carry, or with walkways for workers, anchoring side reinforcements, control means, direction means, stabilizers, levellers and/or signalling sets or other typical elements of this type of platforms, Under certain conditions, and in order to minimise the possible effects of environmental exposure, it could be convenient to provide the structure surfaces with protective coating, such as stable paint or similar.

Once supplemented and in use, the floating structures as described herein can be used in modules as part of an alignment of structures and joined, for example, with stand-alone devices that buffer bending, compression, torsion and shifting thereof, so that the main members of all structures are longitudinally oriented according to the advance of the alignment for better adjustment to the sea bed.

DESCRIPTION OF THE DRAWINGS

An embodiment of a floating structure is shown, by way of an example but not limitative, in the accompanying drawings, wherein:

FIG. 5 is a smaller-scale plan view that shows a possible support to form the structure, illustrating the stage when a tube of the second plurality of tubes is fed and inserted by force in the tubes of the first plurality of tubes as well as others previously inserted by the pulling force exerted from the winch.

FIG. 6 is an elevation view of FIG. 5.

DESCRIPTION OF THE PREFERRED
EMBODIMENT OF THE INVENTION in a preferred embodiment of the invention, a floating structure is provided to he accordingly supplemented for its use in aquaculture. The structure is mainly built with high-endurance, ow density plastic materials that are especially resistant to sea degradation, for instance, polyethylene, as in the proposed example.

Figure 1:
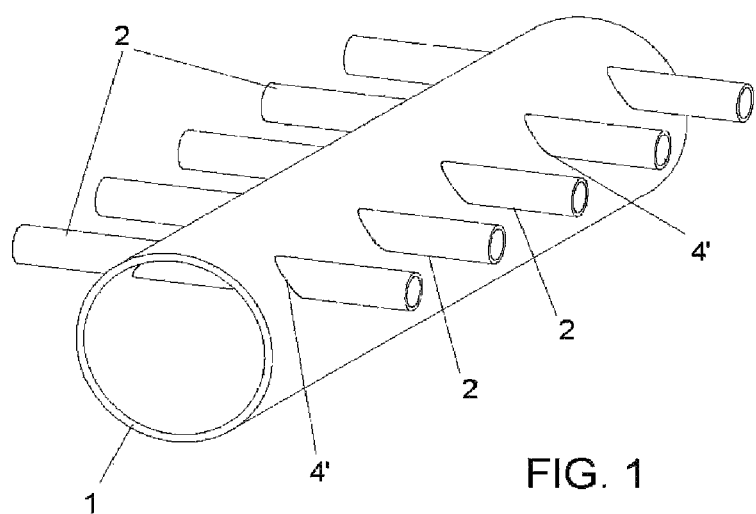
FIG. 1 is a perspective view that shows a schematic representation of a portion of a tube of the first plurality of tubes crossed by several portions of tubes of the second plurality of tubes.
Figure 2:
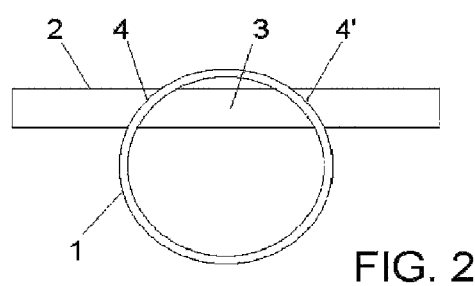
FIG. 2 is an elevation view of FIG. 1.
Figure 3:
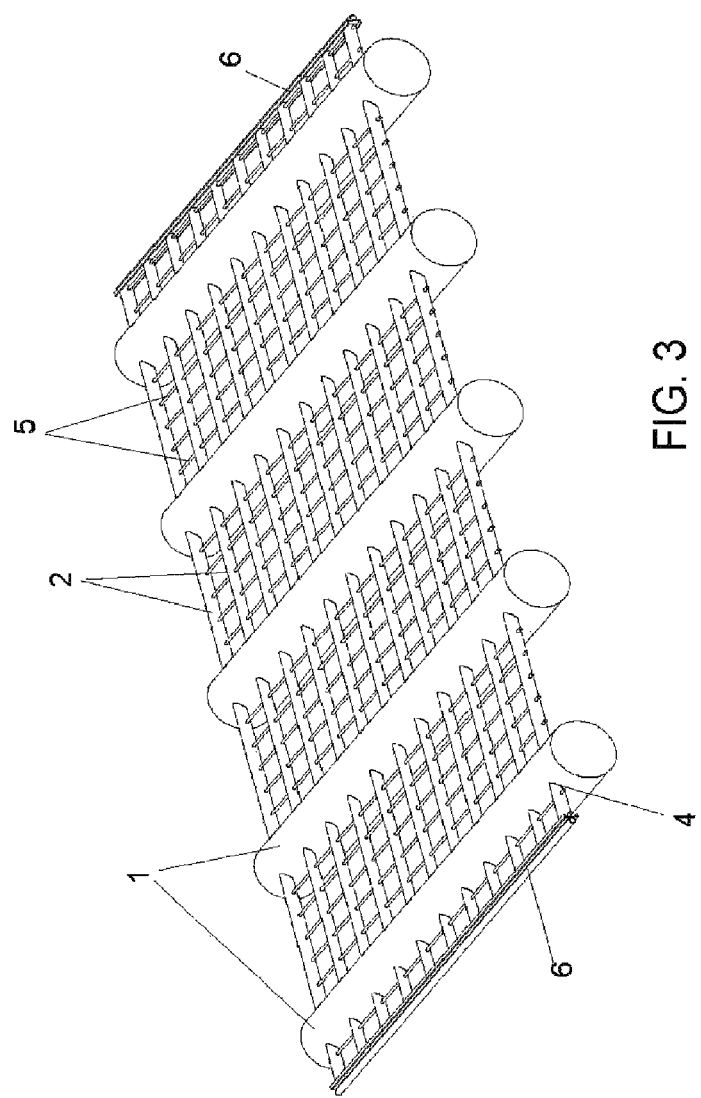
FIG. 3 is a smaller-scale perspective view of a floating structure as per the invention and partially supplemented for use as a shellfish farming platform.

Referring to FIGS. 1 to 3, it can be seen that the floating structure is made up of main hollow members or the first plurality of tubes (1) and of smaller-diameter secondary members or second plurality of tubes (2), and being the first plurality of tubes (1) and the second plurality of tubes (2) related to each other. More specifically and referring to FIGS. 1 and 2, it can be seen that each tube (1) of the first plurality of tubes (1) shows an alignment of pairs of holes (4, 4') in their periphery. Hales (4, 4') of each pair of hales (4, 4') can be seen as horizontally facing each other on the upper semi-cylindrical portion of tubes (1) and at both ends of an imaginary line running across the longitudinal axis of each tube (1) and parallel over the horizontal plane that divides it into two semi-cylindrical portions. Pairs of holes (4, 4') on each tube (1) are equidistant from each other and each pair of its (4,4') is crossed by a tube (2) of the second plurality of tubes (2), so that part of the connection (3) is provided as confined inside the tube (1) the ends of which are welded to the periphery of the respective hales (4, 4') across the tube (1), as best shown in FIG. 2.

As per what is shown in FIG. 3, the floating structure is provided with a plurality of main members or first plurality of tubes (1), of a diameter ranging from 600 to 1200 mm, crossed by the second plurality of secondary members or second plurality of tubes (2) which have a sensibly smaller diameter, between 100 and 250 mm. The first plurality of tubes (1) and the second plurality of tubes (2) are provided as coupled together so that they make a grid-like structure. The second plurality of tubes (2) is inserted across the first plurality of tubes (1) and bath are welded together, as it was previously described, in order to secure the structure as a single, solid block in which the tubes from the first plurality of tubes (1) are kept to equidistant from and parallel to each other by the tubes of the second plurality of tubes (2). The example shows that the ends of the tubes of the first plurality of tubes (1) are closed in order to be used as flotation tanks when the floating structure is supplemented for a specific use, for example, as a farming platform.

In the example shown in FIG. 3, rods (5) from where the rapes of the farming platform will hang (unrepresented) crass the tubes of the second plurality of tubes (2) and are also welded to each one of them. An anchoring reinforcement (6) closes the tube mouths (2) of the second plurality of tubes (2).

Figure 4:
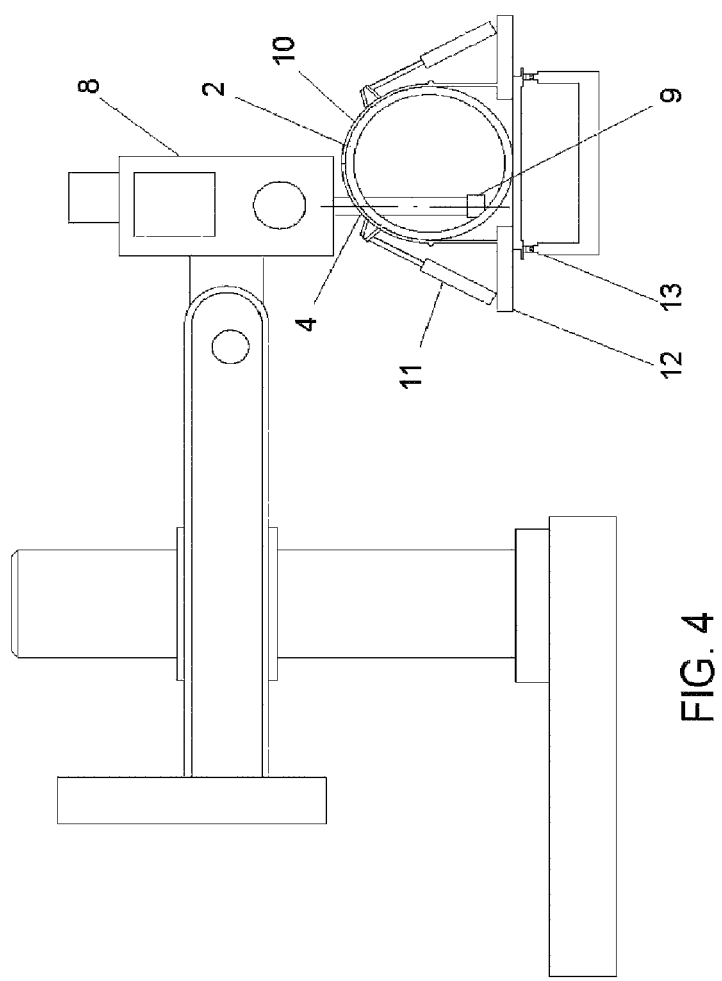
FIG. 4 shows the drilling of a pair of holes facing each other on a tube of the first plurality of tubes.

Moreover, the invention provides for a method for obtaining the floating structure that includes a first plurality of tubes (1), of a specific length and diameter, and a second plurality of tubes (2) of a specific length though smaller diameter. For improved execution, a fixed support frame (7), as the one shown in FIG. 5 is provided, which includes cradles or support bases (14) longitudinally distant and parallel to locate the tubes (1) of the first plurality of tubes (1), once they have been drilled, as shown in FIG. 4, with a vertical drill (8). Under the action of said drilling tool (9) and after each tube (1) has been locked with straps (10) and pneumatic or hydraulic assistance (11) to a frame (12) tad on a support base (13), the required alignment of pairs of hales (4,4') facing each other on their periphery is made, being understood that each pair (4,4') is successively obtained in one same drilling line performed transversally the longitudinal axis of tube (1) and parallel to it. Drilling lines of each of the successive pairs of hales (4,4') in the alignment are parallel to each other and all pairs of hales (4,4') on each tube (1) are equidistant from each other.

As shown in FIGS. 5 and 6, tubes (1) of the first plurality of tubes (1) are carefully laid an cradles (14), so that the respective pairs of notes (4,4') of any of tubes (1) remain aligned in the centre with the corresponding pairs of holes (4,4') of the remaining tubes (1) laid on the fixed support frame (7) and locked to due position with clamps (15), for instance.

Tubes (2) of the second plurality of tubes (2) are placed on the structure being formed, one by one and successively, with a feeder (20), equipped with rolls (21) and mechanical assistance (21') to slide the tubes (2) and move them sideways onto the frame (7) along guides (22) for longitudinal alignment with the respective and corresponding alignment of pairs of hales (4,4') in the tubes (1) of the first plurality of tubes (1) to be crossed, as shown in FIGS. 5 and 6.

In each successive act of putting a tube in place by feeder (20), for example as shown in FIGS. 5 and 6, engagement or adjustable means (17) at the end of cable (16) capable rolling in winch (18) running on guides (19) on the opposite side of fixed support frame (7) is adjusted to the inner periphery in tube mouth (2) so that, once cable (16) is secured to fed tube (2), it is puffed therefrom with winch (18) to pass by force through the first alignment of hales (4 4') of adjusted diameter, from the first tube (1) of the first plurality of tubes (1) distal to winch (18) to the fast tube (1) of the first plurality of tubes (1) proximal to winch (18), to finally loosen up adjustable means (17) and separate cable (16) from tube (2); this is done until all tubes (1), one by one, of the first plurality of tubes (1) are crossed by all tubes (2) of the second plurality of tubes (2).

Finally, for example, on frame (7), tube portions (3) of any tube (2) of the second plurality of tubes (2) are welded to the immediate periphery of holes (4, 4') drilled on each one of tubes of the first plurality of tubes (1), where they are confined.

The invention has been described as per the illustrated embodiment. Modifications or replacements may be provided, and some of the stages or operations herein described may be changed or eliminated, without departing from the scope of the invention.

The invention claimed is:

1. A floating structure, comprising a first plurality of tubes and a second plurality of tubes arranged to maintain tubes of the first plurality of tubes longitudinally equidistant from and parallel to each other, the first plurality of tubes and the second plurality of tubes being arranged with each other to form a grid structure,
    each tube of the first plurality of tubes has present therein pairs of holes aligned in a periphery of said tube and said pairs of holes being centered and facing each other at either end of a line running transversally to a longitudinal axis of each tube, all said pairs of holes in each tube being equidistant from each other and said pairs of holes facing each other in each tube and forming the first plurality of tubes respectively crossed by corresponding tubes of the second plurality of tubes such that a portion of a same tube of said corresponding tubes of said second plurality of tubes are present in a respective one of said pairs of holes of the tubes of the first plurality of tubes and thereby cross-link the tubes of the first plurality of tubes at respective peripheries thereof with the second plurality of tubes,
    wherein said line running transversally to a longitudinal axis of each tube being parallel over a horizontal plane that divides the tube into two semi-cylindrical portions, and is on the upper semi-cylindrical portion of tubes such that the second plurality of tubes extend through the upper semi-cylindrical portion of the tubes of the first plurality of tubes; and a plurality of rods which cross and attach to the tubes of the second plurality of tubes with an anchoring reinforcement that closes the tube mouths of the second plurality of tubes.

* * * * *